Patented Jan. 19, 1926.

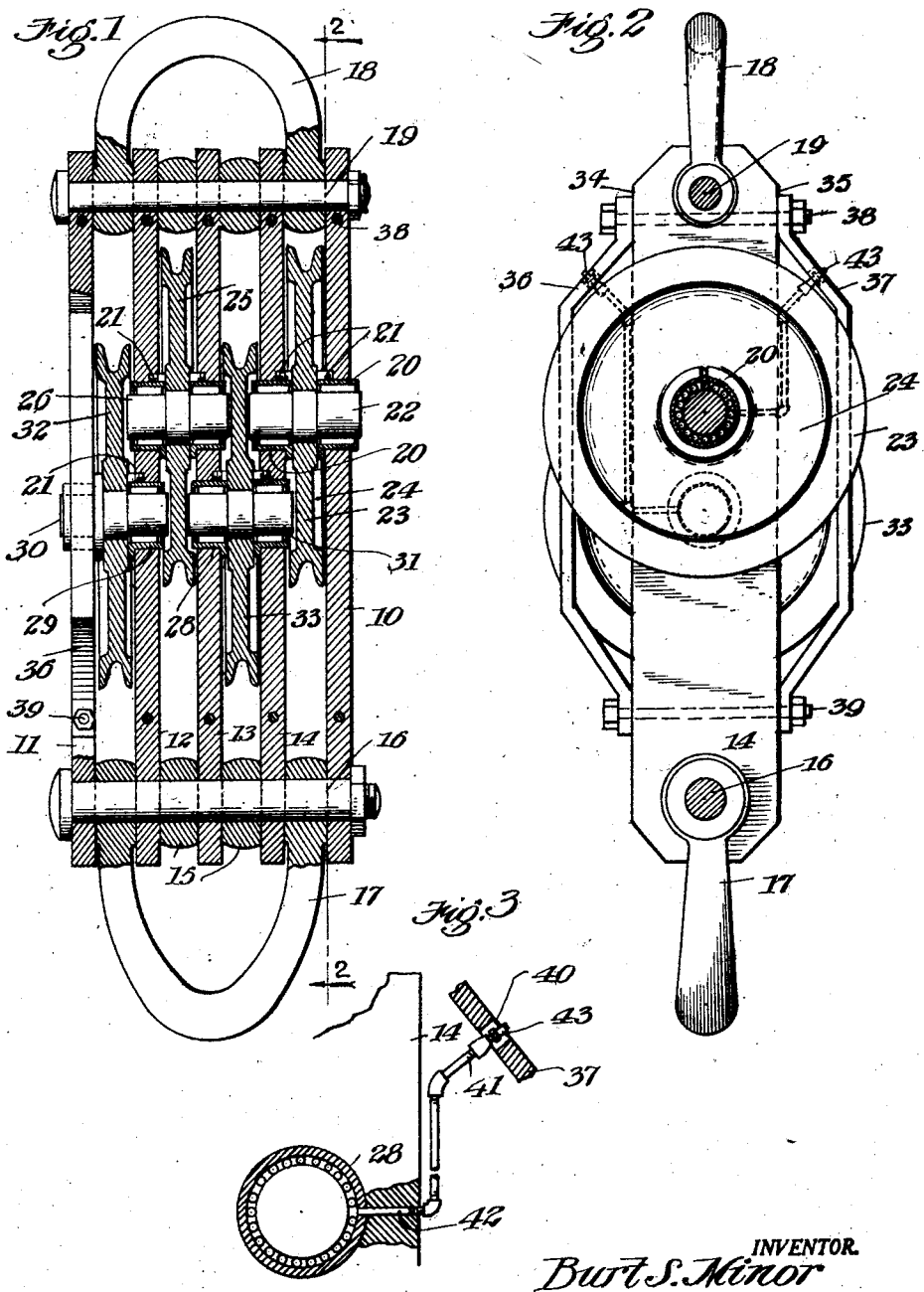

1,570,271

UNITED STATES PATENT OFFICE.

BURT S. MINOR, OF LOS ANGELES, CALIFORNIA, ASSIGNOR TO REGAN FORGE AND ENGINEERING COMPANY, INC., OF SAN PEDRO, CALIFORNIA, A CORPORATION OF CALIFORNIA.

SHEAVE BLOCK.

Application filed July 3, 1923. Serial No. 649,244.

*To all whom it may concern:*

Be it known that I, BURT S. MINOR, a citizen of the United States, residing at Los Angeles, in the county of Los Angeles and State of California, have invented new and useful Improvements in Sheave Blocks, of which the following is a specification.

This invention relates more specifically to a travelling block construction designed for use in connection with oil well drilling operations.

An important object of this invention is to provide a travelling sheave block construction in which each of the sheaves are rigidly mounted on independent pins or shafts and rotating in anti-friction bearings, the construction being so arranged that while each sheave has an independent bearing, the face width of the block is not materially increased over blocks in which the sheaves are mounted to rotate on a single fixed bearing.

A further object is to provide a novel means of supplying a lubricant to each of the sheave bearings.

Further objects and advantages of construction will be apparent from the following description, reference being had to the drawings accompanying the same, in which:

Fig. 1 is a partial central vertical section through the sheave block.

Fig. 2 is a sectional side view of the sheave block, taken on line 2—2 of Fig. 1.

Fig. 3 is an enlarged partial detail of the block construction showing the method and means of lubricating the sheave bearings.

In the formation of travelling sheave block constructions, it has been the practise to mount the sheaves on a single fixed bearing pin, supplying a lubricant to each sheave through the pin. This construction has not proved entirely satisfactory mainly for the reason that the bearing shaft or pin often becomes badly grooved and worn by the rotating sheaves, thereby causing frequent replacement of the worn pin.

By fixedly mounting each sheave on an independent bearing shaft or pin and providing anti-friction bearings therefor, the above recited disadvantages are largely obviated, no replacement of bearing pins being necessitated as there will be little if any wear of the same during the life of the block.

Referring more specifically to the drawings, the frame of the sheave block consists of outer straps or plates 10, 11, and inner straps or plates 12, 13, 14, suitably spaced apart by separators 15. Pivotally mounted on a bolt 16, passing through the lower ends of straps 10, 11, 12, 13, and 14, is a lower clevis 17, its ends being disposed between plates 11, 12, and 10 and 14. An upper clevis 18 is similarly attached to a bolt 19 at the upper end of the plates.

Mounted in plates 10 and 14, are antifriction roller bearing cages 20, held in position by threaded dowel pins 21. Mounted in cages 20 is a sheave pin 22 on which is rigidly secured midway between its ends a sheave 23, its side walls being cored as at 24 so as to obtain as great a pin bearing surface as possible without increasing the face width of the sheave block. Plates 12, 13, carry a similar sheave 25, its pin 26 being in horizontal alignment with sheave pin 22, and its ball bearing cages which are similar to cages 20, are secured in the plates in the same manner. Mounted between each pair of plates 11, 12, and 13, 14, and directly below the bearings for sheaves 23, 25, are roller bearing cages 28, 29, in which are mounted horizontally aligned bearing pins 30, 31, on which are rigidly secured sheaves 32, 33, the construction of the bearings and the sheaves being exactly the same as those heretofore described.

Secured to each of the vertical edges 34, 35 of the various straps, are outwardly extending guide straps 36, 37, their ends being secured to the straps by means of bolts 38, 39, designed to guide the sheave cables in the proper direction when the block is in operation, and to prevent accidental entanglements, as clearly shown in Fig. 2 of the drawings.

Each of the upper ends of straps 36, 37, are provided with an aperture 40 through which projects the upper end of a lubricating pipe line 41 which extends downwardly, the lower end being in threaded engagement with a transversely extending bore 42 formed in each of plates 10, 11, 12, 13, and 14, the inner end of the bores communicating with the various roller bearing cages. The upper end of each lubricating line is provided with a nipple 43 for the attachment of a grease gun thereto of usual construction, when it is desired to lubricate any of the roller bearings.

By coring the side faces of the various sheaves and arranging them in staggered relation to each other and in vertical alinement with the longitudinal axis of the block, I am enabled to obtain the maximum bearing surface for each sheave and to form a compact structure of approximately the same weight and size as sheave blocks of usual formation.

What I claim is:

1. A sheave block construction, comprising a plurality of straps spaced apart and provided at each end with a swinging clevis, a plurality of pairs of anti-friction bearings mounted in said plates and arranged in staggered relation, and a plurality of sheaves having rigid bearing pins mounted in said bearings.

2. A sheave block construction, comprising a frame consisting of a plurality of plate straps spaced apart, a plurality of sheaves rotatively mounted in said frame between said straps and arranged in staggered relation, and a plurality of cable guide straps secured to the vertical edges of said plate straps.

3. A sheave block construction, comprising a plurality of strap plates spaced apart, anti-friction bearings mounted in each of said strap plates and arranged in pairs, said pairs of bearings being disposed in staggered relation, and a plurality of sheaves each provided with trunnions mounted in said bearings.

4. A sheave block construction, comprising a frame consisting of a plurality of plate straps spaced apart, anti-friction bearings mounted in each of said straps and arranged in pairs, said pairs of bearings disposed in staggered relation, and a plurality of sheaves having cored side walls and bearing pins mounted in said bearings.

5. A sheave block, comprising a frame composed of a plurality of elongated vertically disposed plates spaced apart, a plurality of sheaves mounted in independent bearings between said plates, said bearings being in vertical alinement and in transverse staggered relation to each other, whereby to decrease the face width of the sheave block.

In witness that I claim the foregoing I have hereunto subscribed my name this 2nd day of June, 1923.

BURT S. MINOR